(12) United States Patent
Bell et al.

(10) Patent No.: US 8,694,732 B2
(45) Date of Patent: Apr. 8, 2014

(54) ENHANCED COHERENCY TRACKING WITH IMPLEMENTATION OF REGION VICTIM HASH FOR REGION COHERENCE ARRAYS

(75) Inventors: Robert H. Bell, Austin, TX (US); Jason F. Cantin, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 34 days.

(21) Appl. No.: 13/398,922

(22) Filed: Feb. 17, 2012

(65) Prior Publication Data

US 2012/0151297 A1   Jun. 14, 2012

Related U.S. Application Data

(63) Continuation of application No. 12/177,176, filed on Jul. 22, 2008, now Pat. No. 8,140,766.

(51) Int. Cl.
*G06F 12/00* (2006.01)

(52) U.S. Cl.
USPC ............ 711/133; 711/141; 711/E12.018; 711/135; 711/146

(58) Field of Classification Search
None
See application file for complete search history.

(56) References Cited

PUBLICATIONS

Bell, et al., U.S. Appl. No. 12/177,176, Notice of Allowance dated Nov. 15, 2011.
Bell, et al., U.S. Appl. No. 12/177,176, Final Office Action dated Sep. 1, 2011.
Bell, et al., U.S. Appl. No. 12/177,176, Non-Final Office Action dated Mar. 17, 2011.

*Primary Examiner* — Reginald Bragdon
*Assistant Examiner* — Brendan Lillis
(74) *Attorney, Agent, or Firm* — Yudell Isidore Ng Russell PLLC (57) ABSTRACT

A method and system for precisely tracking lines evicted from a region coherence array (RCA) without requiring eviction of the lines from a processor's cache hierarchy. The RCA is a set-associative array which contains region entries consisting of a region address tag, a set of bits for the region coherence state, and a line-count for tracking the number of region lines cached by the processor. Tracking of the RCA is facilitated by a non-tagged hash table of counts represented by a Region Victim Hash (RVH). When a region is evicted from the RCA, and lines from the evicted region still reside in the processor's caches (i.e., the region's line-count is non-zero), the RCA line-count is added to the corresponding RVH count. The RVH count is decremented by the value of the region line count following a subsequent processor cache eviction/invalidation of the region previously evicted from the RCA.

20 Claims, 6 Drawing Sheets

```
If ((region_size * RCA_sets) >= (line_size * cache_sets)) Then
    Max_count = lg((region_size / line_size)*(L1_assoc+L2_assoc)) + 6
Else
    Max_count = lg((region_size / line_size)*(L1_assoc+L2_assoc)*
               (line_size*cache_sets / region_size*RCA_sets))

Count_size = ⌈lg(Max_count)⌉
```

ENHANCED COHERENCY TRACKING WITH IMPLEMENTATION OF REGION VICTIM HASH FOR REGION COHERENCE ARRAYS

PRIORITY CLAIM

The present application is a continuation of and claims priority from U.S. patent application Ser. No. 12/177,176, filed on Jul. 22, 2008, titled "Enhanced Coherency Tracking with Implementation of Region Victim Hash for Region Coherence Arrays. The content of that application is incorporated by reference herein.

BACKGROUND

1. Technical Field

The present invention generally relates to data processing systems and in particular to clustered shared-memory multiprocessors. More particularly, the present invention relates to an efficient region coherence protocol for clustered shared-memory multiprocessor systems.

2. Description of the Related Art

To reduce global bandwidth requirements within a computer system, many modern shared-memory multiprocessor systems are clustered. The processors are divided into groups called symmetric multiprocessing nodes (SMP nodes), such that processors within the same SMP node may share a physical cabinet, a circuit board, a multi-chip module, or a chip, thereby enabling low-latency, high-bandwidth communication between processors in the same SMP node. Two-level cache coherence protocols exploit this clustering configuration to conserve global bandwidth by first broadcasting memory requests for a line of data from a processor to the local SMP node, and only sending memory requests to other SMP nodes if necessary (e.g., if it is determined from the responses to the first broadcast that the requested line is not cached on the local SMP node). While this type of two-level cache coherence protocol reduces the computer system global bandwidth requirements, memory requests that must eventually be broadcast to other SMP nodes are delayed by the checking of the local SMP node first for the requested line, causing the computer system to consume more SMP node bandwidth and power. It is important for performance, scalability, and power consumption to first send memory requests to the appropriate portion of the shared-memory computer system where the cached data is most likely to be found.

Coarse-Grain Coherence Tracking for Region Coherence Arrays may avoid unnecessary broadcasts of memory requests in broadcast-based, shared-memory multiprocessor systems. However, a key problem with Region Coherence Arrays is that in order to operate correctly, lines must occasionally be evicted from the processor's cache hierarchy. Region Coherence Arrays must maintain inclusion over a processor's cache hierarchy. Thus, when a region is evicted from the Region Coherence Array to make room for another region, the evicted region's lines must be evicted from the processor's cache hierarchy.

The eviction of cache lines for inclusion is very difficult to implement and detrimental to performance, reducing cache hit rates and offsetting the benefits of Region Coherence Arrays. Though Region Coherence Arrays may favor regions with no lines cached for replacement, the line eviction issue remains a problem. The problem worsens if the Region Coherence Array is scaled down in size. Thus, large Region Coherence Arrays are generally required.

An alternative implementation of Coarse-Grain Coherence Tracking is Region Scout Filters. Region Scout Filters consist of non-tagged, address-indexed hash tables of counts to track lines in the processor's cache hierarchy (Cached Region Hash/CRH), and separate, tagged arrays (Non-Shared Region Table/NSRT) for the addresses of non-shared regions recently touched by the processor. By using non-tagged hash tables of counts, Region Scout Filters are able to maintain inclusion over the cache hierarchy without having to evict lines, provided the counts are large enough to represent all cache lines that may hash to an entry. This benefit comes at the cost of precision. A count in the Cached Region Hash is the sum of all lines cached from all regions hashing to that entry, and a non-zero count means that the processor may cache a requested region. Once a processor brings a line into the cache hierarchy and increments the count in the corresponding CRH entry, all regions mapping to that CRH entry are considered "shared" by the rest of the system. Other processors must broadcast requests for lines in those regions. The smaller the CRH, the higher the percentage of non-zero counts, and the less effective is the Region Scout Filter. In practice, very large hash tables are required to make Region Scout Filters effective, as the Region Scout Filter is only effective if most of the counts are zero.

SUMMARY OF ILLUSTRATIVE EMBODIMENTS

Disclosed are a method and system for precisely tracking lines evicted from a region coherence array (RCA) without requiring eviction of the lines from a processor's cache hierarchy. The RCA is a set-associative array which contains region entries consisting of a region address tag, a set of bits for the region coherence state, and a line-count for tracking the number of region lines cached by the processor. Tracking of the RCA is facilitated by a non-tagged hash table of counts represented by a Region Victim Hash (RVH). When a region is evicted from the RCA, and lines from the evicted region still reside in the processor's caches (i.e., the region's line-count is non-zero), the RCA line-count is added to the corresponding RVH count. The RVH count is decremented by the value of the region line count following a subsequent processor cache eviction/invalidation of the region previously evicted from the RCA.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

The illustrative embodiments provide a method and system for precisely tracking lines evicted from a region coherence array (RCA) without requiring eviction of the lines from a processor's cache hierarchy. The RCA is a set-associative array which contains region entries consisting of a region address tag, a set of bits for the region coherence state, and a line-count for tracking the number of region lines cached by the processor. Tracking of the RCA is facilitated by a non-tagged hash table of counts represented by a Region Victim Hash (RVH). When a region is evicted from the RCA, and lines from the evicted region still reside in the processor's caches (i.e., the region's line-count is non-zero), the RCA line-count is added to the corresponding RVH count. The RVH count is decremented by the value of the region line count following a subsequent processor cache eviction/invalidation of the region previously evicted from the RCA.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). Where a later figure utilizes the element in a different context or with different functionality, the element is provided a different leading numeral representative of the figure number (e.g, 1xx for FIG. 1 and 2xx for FIG. 2). The specific numerals assigned to the elements are provided solely to aid in the description and not meant to imply any limitations (structural or functional) on the invention.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized.

Figure 1:
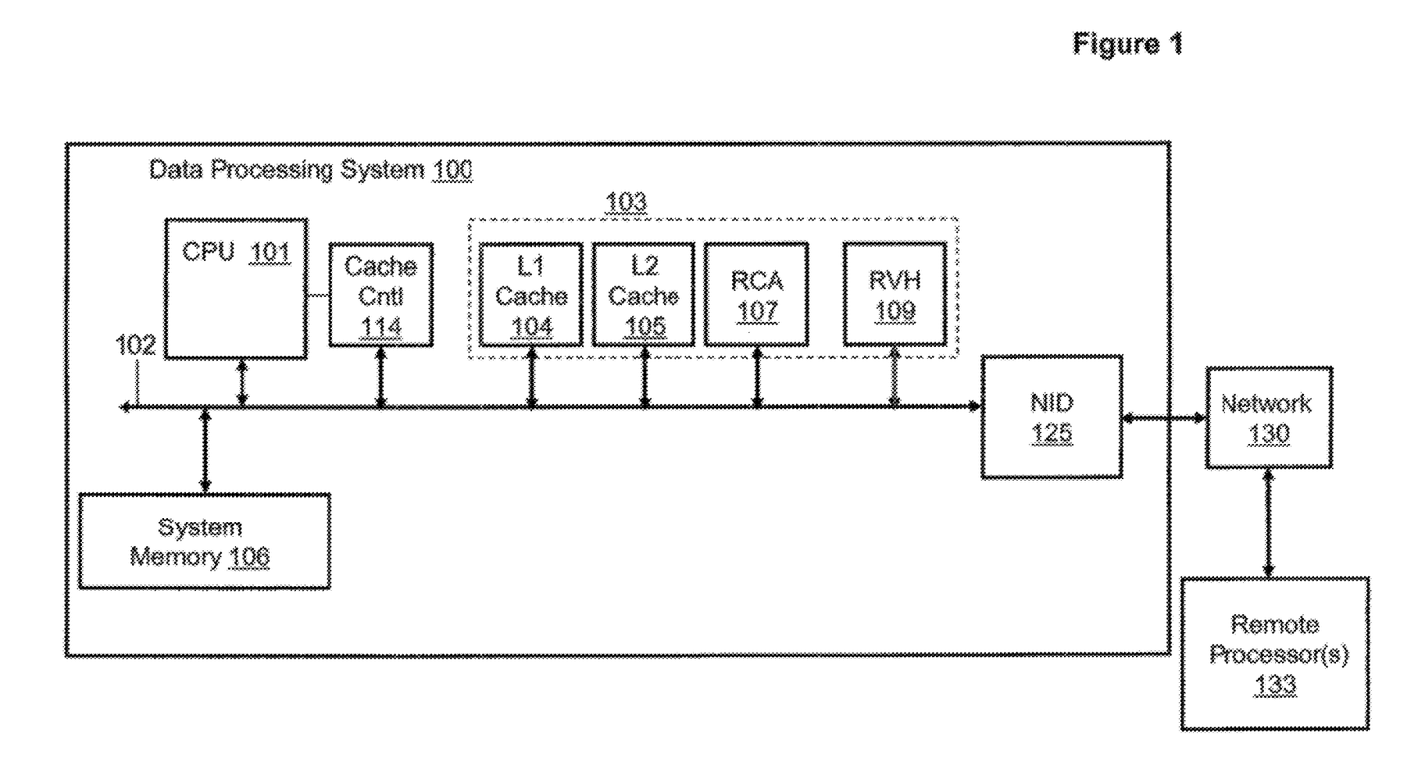
FIG. 1 is a block diagram representation of a data processing system, according to one embodiment.

With reference now to FIG. 1, there is depicted a block diagram representation of a data processing system (and connected network). DPS 100 comprises at least one processor or central processing unit (CPU) 101 connected to system memory 106 via system interconnect/bus 102. In addition, DPS 100 comprises cache controller 114, which is connected to CPU 101 and to system bus 102. Cache controller 114 controls access to cache sub-system 103, which is connected to system bus 102. In other implementations, cache sub-system 103 may be directly connected between one or more processors (CPU 101) and memory 106, in one of several possible configurations. Additionally, multiple levels of cache may be provided, including an on-chip processor cache (e.g., a level 1 (L1) cache 104) and one or more lower level caches (e.g., L2 cache 105). Furthermore, illustrated within cache sub-system 103 are Region Coherence Array (RCA) 107 and Region Victim Hash (RVH) 109. DPS 100 is also illustrated with a network interface device (NID) 125, with which DPS 100 connects to one or more processors 133 via access network 130.

Those of ordinary skill in the art will appreciate that the hardware and basic configuration depicted in FIG. 1 may vary. For example, other devices/components may be used in addition to or in place of the hardware depicted. The depicted example is not meant to imply architectural limitations with respect to the present invention.

The described embodiments provide several functional features that are implemented utilizing the components of DPS 100. Specifically, the CPU 101 and cache subsystem 103 utilizes logic (e.g., cache controller logic 114) to provide various functional features, including: (a) logic for precisely tracking lines evicted from a region coherence array (RCA) without requiring eviction of the lines from a processor's cache hierarchy; and (b) logic for combining an implementation of a Region Victim Hash (RVH) with the RCA in order to facilitate the tracking of the evicted lines within the cache memory system. These functional features as well as additional features/functionality are described below within the description of FIGS. 2-5.

Figure 2:
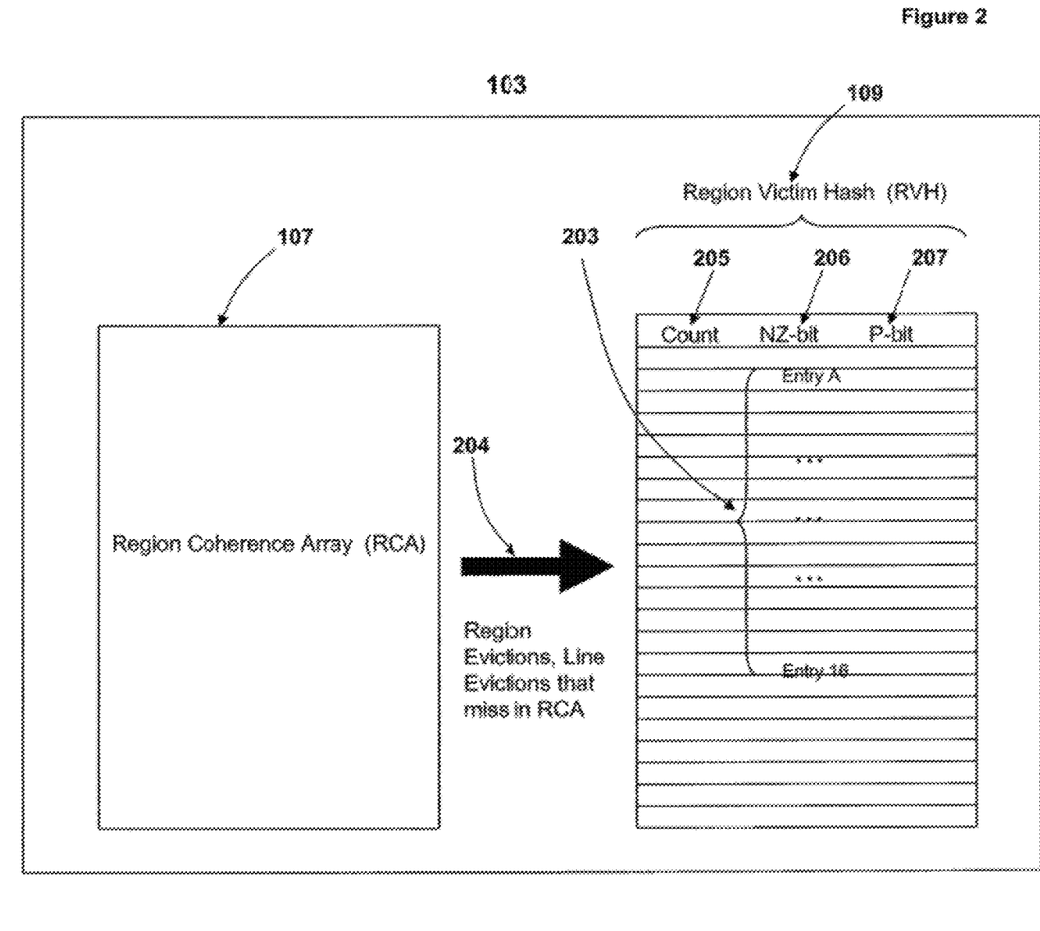
FIG. 2 illustrates a region coherence array (RCA) and a region victim hash (RVH), according to one embodiment.

With reference now to FIG. 2, a collection of cache elements, including a Region Coherence Array and a Region Victim Hash, is illustrated, according to one embodiment. Cache collection 200 comprises region coherence array (RCA) 107 and region victim Hash (RVH) 109. Illustrated with RVH 109 is a collection of entries illustrated as entries 203. Each entry comprises one or more parameters including, for example, count 205, NZ-bit 206 and parity (P) bit 207. In addition, eviction flow 204 is illustrated.

Region Coherence Arrays (107) are tagged, set-associative arrays located in each processor's cache hierarchy (which comprises a set of cache elements). Each RCA entry consists of a region address tag, a set of bits for the region coherence state, and a line-count for keeping track of the number of lines from the region cached by the processor. Optionally, RCA 107 may utilize a set of presence bits (one bit per each line in the region) instead of a line-count to track precisely which lines in the region are cached by the processor. Functioning as intended, RCA 107 maintains inclusion over the cache hierarchy. Hence, when a region is evicted from RCA 107, lines may be evicted from the cache hierarchy. If the line-count or presence bits from an evicted region are non-zero, there are lines from the region cached by the processor that are either ultimately evicted or represented by another structure, such as Region Victim Hash (RVH) 109, in the cache hierarchy.

RVH 109 is a non-tagged, address-indexed hash table of counts collocated with the Region Coherence Array in a processor's memory system (comprising memory 106 and cache components of cache subsystem 103). The RVH counts (205) represent lines in the cache with no corresponding entry in RCA 107. Each count may be the sum of the line-counts from all evicted regions mapping to that entry. If a region is evicted from RCA 107, and lines from the evicted region still reside in the processor's caches (i.e., the region's line-count is non-zero), then the line-count for the region is added to RVH count 205 indexed by the region address. RVH 109 is either a separate physical structure or logically integrated with RCA 107 as a power-of-two number of RVH counts per RCA set. RVH 109 is generally indexed by the lower region-address bits, though a hash function may be used if implemented as a separate physical structure.

In addition to counts 205, each entry of RVH 109 may optionally contain a bit to indicate whether the count is non-zero (NZ-bit 206), and one or more parity bits, P-bit 207.

NZ-bit 206 enables fast access on external snoops. External snoops do not actually require the RVH's count value but find it useful to determine whether count 205 is non-zero. For added efficiency, NZ-bit 206 may be read on external snoops instead of having the whole count read and a zero-detect operation performed.

On processor cache evictions/invalidations, if the corresponding region is not present in RCA 107 (or the region may be present but the line-count is zero), the corresponding count in RVH 109 is decremented by a value based on the number of lines evicted. Alternatively, RCA 107 may utilize presence bits to keep track of lines cached by the processor instead of line-counts. Thus, the corresponding count in RVH 109 is decremented if the region is not present (or the region is present and the presence bit corresponding to the evicted/invalidated line is not set). In either case, a cache line is evicted/invalidated that is not represented in RCA 107, and therefore is represented by RVH 109.

RVH 109 obviates the need to evict lines from the cache hierarchy upon evicting regions from RCA 107, at the cost of a small amount of additional storage. Each entry in RVH 109 consists only of a count (and possibly two other bits). The count need only be large enough to represent all cache lines mapping to that entry. A small RVH (109) consists of one count per set of RCA 107, and one to two bytes of storage per Region Coherence Array set. The storage allocation represents a very low overhead. The combination of RCA 107 with RVH 109 allows the precise tracking of regions from which the processor is caching lines. This precise tracking is only possible with a tagged, associative structure, without the complex and potentially-harmful cache evictions for inclusion.

With more precise tracking, the combination of RCA 107 and RVH 109 performs better than a Region Scout Filter that uses a hash table alone to represent cached data. Without cache evictions for inclusion, RCA 107 performs better and scales down to a smaller and efficient size. With larger RHVs, smaller RCAs are required, allowing designers to trade storage between the two components for optimal performance.

Figure 3:
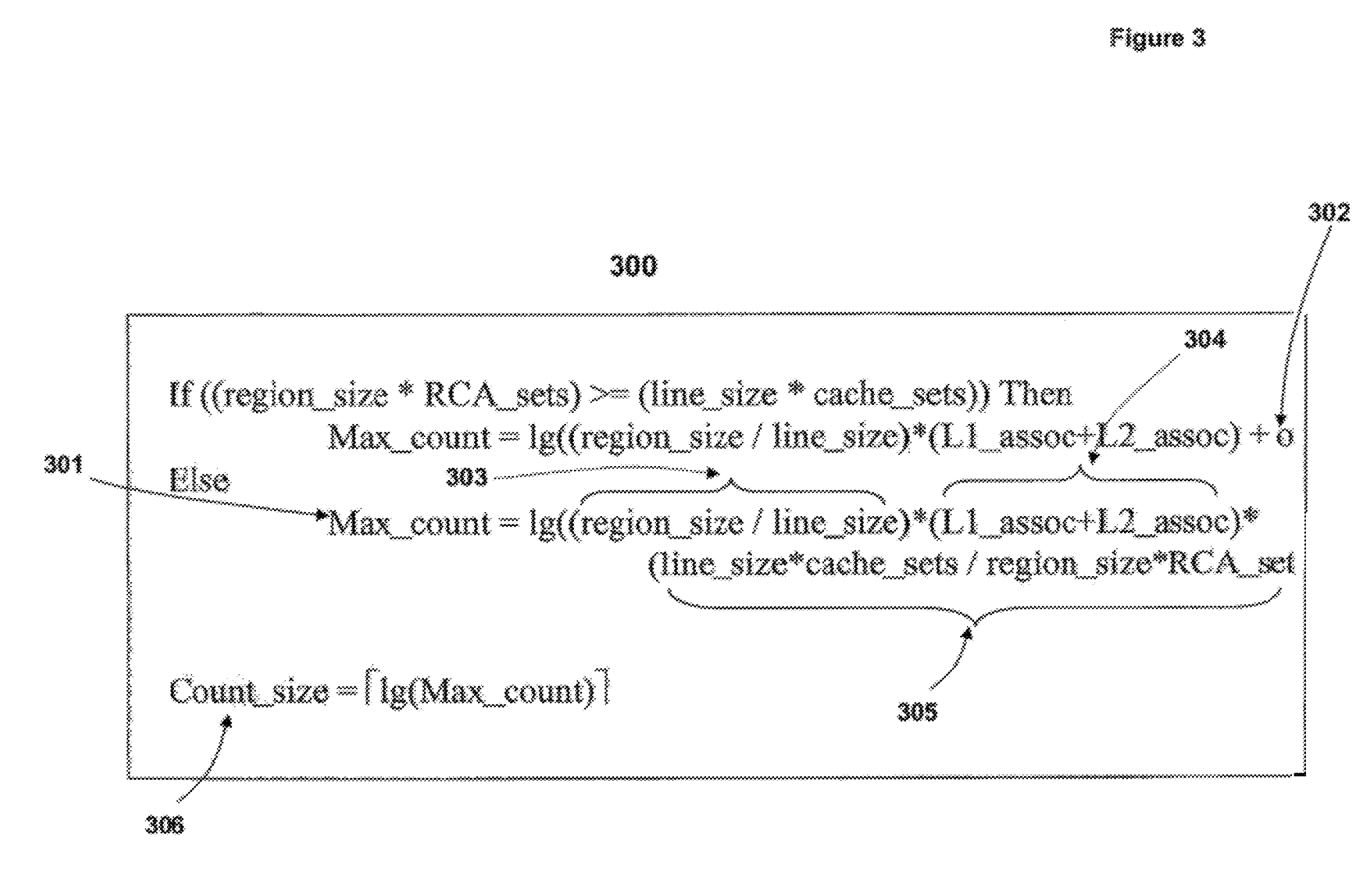
FIG. 3 illustrates an algorithm used to determine the RVH count pertaining to cached lines, according to one embodiment.

FIG. 3 illustrates an algorithm used to determine the RVH count pertaining to cached lines, according to one embodiment of the invention. Count algorithm 300 comprises a group of count value parameters including (count) result 301 and total outstanding requests "o" 302. Also included in count algorithm 300 is the number of lines in a region (303) and the sum (304) of the associativities of the caches in the processor's cache hierarchy. Additionally, the ratio (305) of the cache index range to the Region Coherence Array index range and the size (306) of the count in bits are illustrated.

For a Region Victim Hash (109) indexed by the lower region-address bits, each count 205 has a maximum result (301) that is the sum of the number of outstanding requests (302) and the multiplicative product of the following numbers: the number of lines in a region (303), the sum (304) of the associativities of the caches in the processor's cache hierarchy (or the maximum associativity for inclusive hierarchies), and the ratio (305) of the cache index range to the Region Coherence Array index range (if greater than one). The size (306) of the count in bits is obtained by taking the ceiling function of the base-2 logarithm of the preceding result (301). If Region Coherence Array 107 favors regions with no lines cached for eviction, before performing the base-2 logarithm, the associativity of Region Coherence Array 107 may be subtracted. A region with lines cached is evicted only if all other regions in the set had at least one line cached. Furthermore, a region is allocated in Region Coherence Array 107 only when a line is allocated in the processor's cache hierarchy. A Region Victim Hash (109) with a more complex hash function may require counts large enough to represent all lines in the cache hierarchy.

When regions with a non-zero line-count (or non-zero presence bits) are evicted from Region Coherence Array 107, the region address and line-count (or presence bits) are sent to Region Victim Hash 109 instead of to a mechanism for evicting cache lines. The line-count (or sum of set presence bits) is added to the count in Region Victim Hash 109, indexed by the region address, and the NZ-bit is set. When lines are evicted or invalidated from the cache, the Region Victim Hash count is decremented if there is not a corresponding entry for the region in Region Coherence Array 107 with non-zero line-count. Alternatively, a non-zero presence bit may indicate a presence of the corresponding region. If the Region Victim Hash count is decremented to zero, the NZ-bit is cleared. Note that there are no increments to the Region Victim Hash counts. Processor requests to lines for which there is no matching entry in Region Coherence Array 107 allocate a new entry for the region. Region Victim Hash counts are increased only when a region with non-zero line-count is evicted from Region Coherence Array 107. Furthermore, Region Victim Hash counts are decremented only as lines are removed from the cache hierarchy. The Region Victim Hash counts are prevented from either an underflow or overflow.

When regions with a zero line-count (or all-zero presence bits) are evicted from Region Coherence Array 107, no information is sent to Region Victim Hash 109. Because there are no lines from the region cached by the processor, nothing needs to be added to the corresponding Region Victim Hash count, and the NZ-bit remains unchanged. Thus, Region Victim Hash 109 is used to represent lines cached by the processor for which there is not a corresponding entry for the region in Region Coherence Array 107.

For correctness, the transfer of non-zero line-counts from Region Coherence Array 107 to Region Victim Hash 109 is performed to avoid timing races. Either the transfer is atomic, or the region is maintained in the Region Coherence Array 107 with non-zero line-count (or non-zero presence bits) until the Region Victim Hash count is updated. Thus, an external request received during the eviction of a region is prevented from incorrectly inferring that the processor does not cache lines from the region.

In the uncommon case that (1) a region with non-zero line-count (or non-zero presence bits) is evicted from the Region Coherence Array, 2) the region is moved to the Region Victim Hash, and (3) a subsequent processor request for a line in the region reallocates an entry in the Region Coherence Array, lines from the region are consequently present in both structures (RCA and RVH). No action is required in this case to ensure correct operation. The lines may be correctly represented in either structure. The drawbacks are that (1) lines in the Region Victim Hash cause all lines from regions mapping to that entry in the Region Victim Hash to appear shared to other processors (when in reality only lines from the one region that are also in the Region Coherence Array are cached) and (2) regions may have a zero line-count (or zero presence bits) in the Region Coherence Array, while having more than zero lines cached due to lines represented by the Region Victim Hash. These regions may be improperly favored for eviction from the Region Coherence Array in the future. In the case of a Region Coherence Array that utilizes presence bits, lines from the Region Victim Hash may be moved to the Region Coherence Array when there is a cache hit and the presence bit corresponding to the line in the Region Coherence Array is zero.

On a parity violation, the processor's cache hierarchy may be flushed to correct the problem. RVH 109 contains metadata, and not actual program data. Hence, if the RVH state becomes corrupted, the cache hierarchy may be flushed, and the RVH state rebuilt as lines are brought into the caches. As a cost reduction measure, Error Correction Code (ECC) bits may be incorporated into each RVH entry or groups of adjacent entries.

Individually, the Region Coherence Array's operation is largely unchanged. Regions with zero lines cached may still be favored for eviction, if possible. As a result, Region Victim Hash counts stay zero whenever possible, and regions with lines cached are kept in the Region Coherence Array where they are more precisely tracked (due to the tagged associative structure of Region Coherence Array 107).

A non-exhaustive list of the main differences between the implementation of the illustrative embodiment and that of a conventional Region Coherence Array include (1) the region snoop response generated by the Region Coherence Array in response to external requests is now bitwise-OR-ed with information from the Region Victim Hash, and (2) there does not need to be an interface between the Region Coherence Array and the cache hierarchy for evicting lines for inclusion. These differences increase efficiency and reduce system complexity in the disclosed embodiment.

Figure 4:
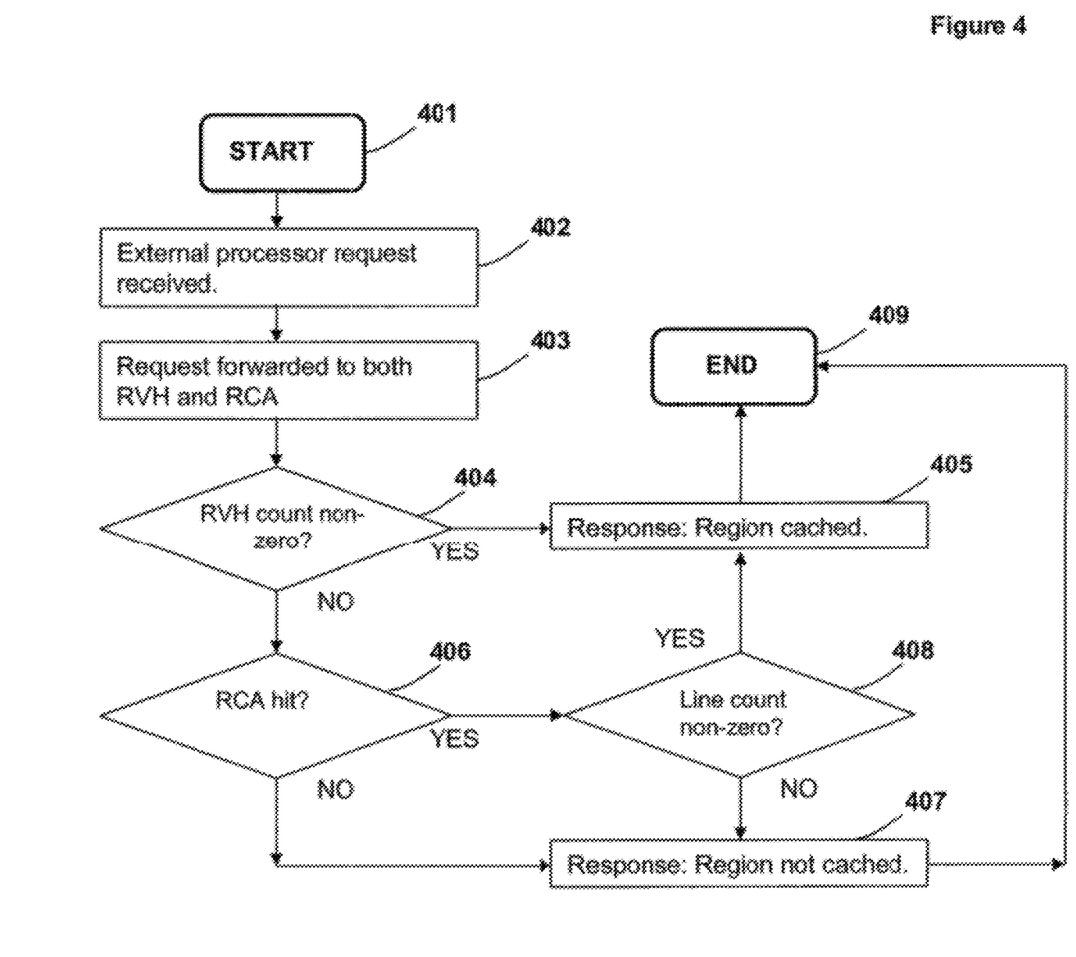
FIG. 4 is a flow chart illustrating the process of determining a response to an external processor request, according to one embodiment.

FIG. 4 is flow chart illustrating the processing of external requests received at a local processor, according to one embodiment. In a multi-processor environment, external processor requests (which may be referred to as "snoops") are occasionally received by the local processor. On external snoops, Region Victim Hash 109 and the Region Coherence Array 107 are accessed in parallel to obtain a region snoop response. The (local) processor responds that the region is cached when (a) the Region Victim Hash count indexed by the requested region address is non-zero or (b) when the requested region is present in the Region Coherence Array with non-zero line-count. The correct region snoop response is generated without the region being present in Region Coherence Array 107, without evicting cache lines for inclusion, and without probing the other processors' cache hierarchies for each line in the requested region.

In addition to the counts, each entry of Region Victim Hash 109 may optionally contain a bit to indicate whether the count is non-zero (the NZ-bit), and one or more parity bits. The NZ-bit enables fast access on external snoops. External snoops do not actually require the Region Victim Hash's count value but are satisfied with determining whether the count is non-zero. For added efficiency, the NZ-bit may be read on external snoops instead of having the whole count read and a zero-detect operation performed.

Region Victim Hash 109 is used to represent lines cached by the processor for which there is not a corresponding entry for the region in Region Coherence Array 107. Thus, in order to ensure correctness, the transfer of non-zero line-counts from Region Coherence Array 107 to Region Victim Hash 109 is completed to avoid timing races. Either the transfer is atomic, or the region is maintained in Region Coherence Array 107 with non-zero line-count (or non-zero presence bits) until the Region Victim Hash count is updated. Thus, an external request received during the eviction of a region is prevented from incorrectly inferring that the processor does not cache lines from the region.

The actions taken in response to external requests to generate the appropriate region snoop response are shown in the flow chart of FIG. 4. The region snoop response is "cached" or "shared" if the Region Victim Hash entry indexed by region address is non-zero. If the Region Victim Hash entry is zero, there are no lines cached by the processor that are not represented by the Region Coherence Array, and the snoop response depends on whether the requested region is present in the Region Coherence Array with non-zero line-count.

The process of FIG. 4 begins at initiator block 401 and proceeds to block 402, at which an external processor request is received at a local processor. At block 403, the request is forwarded to both RVH 109 and RCA 107. At decision block 404, DPS 100/Cache Controller 114 determines whether the RVH count is non-zero. If at block 404, Cache Controller 114 determines that the RVH count is non-zero, the process proceeds to block 405, at which Cache Controller 114 responds to the external request by indicating that the requested region is cached. If at block 404, Cache Controller 114 determines that the RVH count is zero, the process proceeds to decision block 406, at which Cache Controller 114 determines whether there is a cache hit in the RCA. If at block 406, Cache Controller 114 determines that there is a cache hit in RCA 107, the process proceeds to decision block 408, at which Cache Controller 114 determines whether the RCA line-count is non-zero. If at block 406, Cache Controller 114 determines that there is a cache miss in RCA 107, the process proceeds to block 407, at which Cache Controller 114 responds to the external request by indicating that the requested region is not cached.

If at block 408, Cache Controller 114 determines that the RCA line-count is non-zero, the process proceeds to block 405. If at block 408, Cache Controller 114 determines that the RCA line-count is zero, the process proceeds to block 407. The process ends at block 409.

Figure 5A:
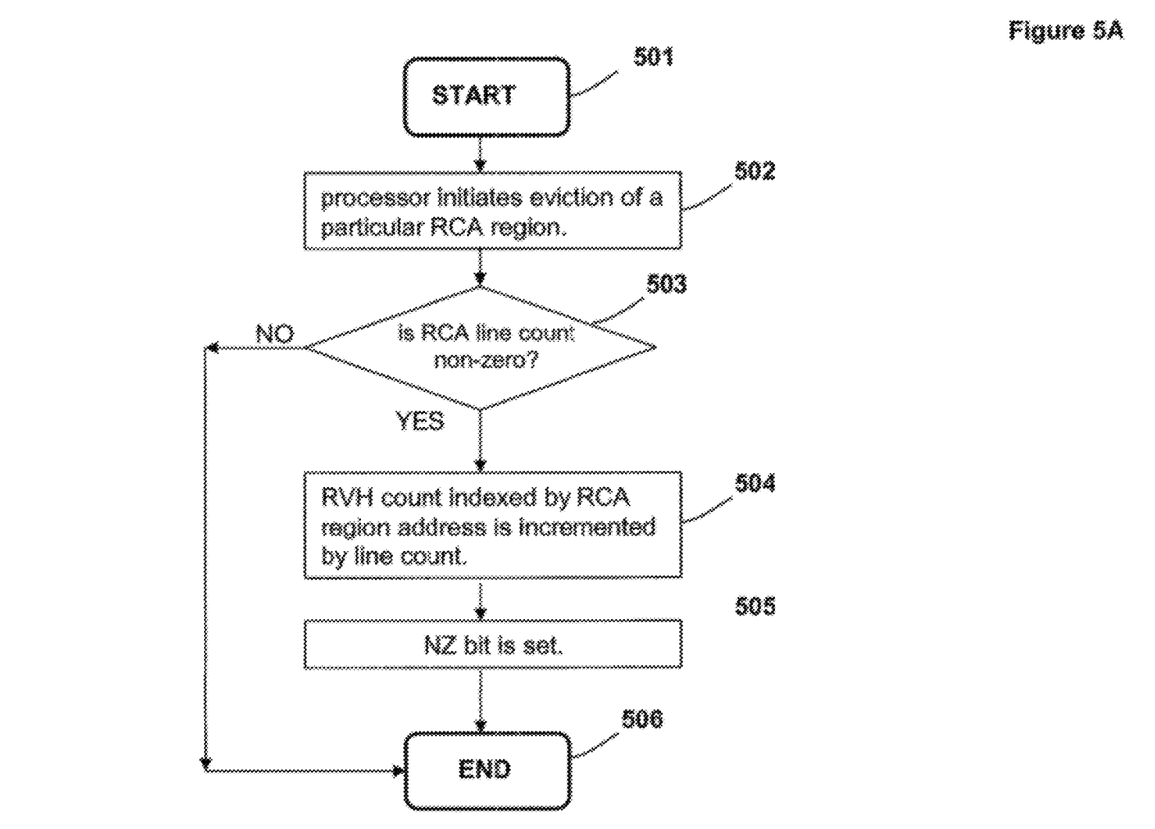
FIG. 5A is a flow chart illustrating the process of determining the RVH count based on eviction of regions from the RCA, according to one embodiment.
Figure 5B:
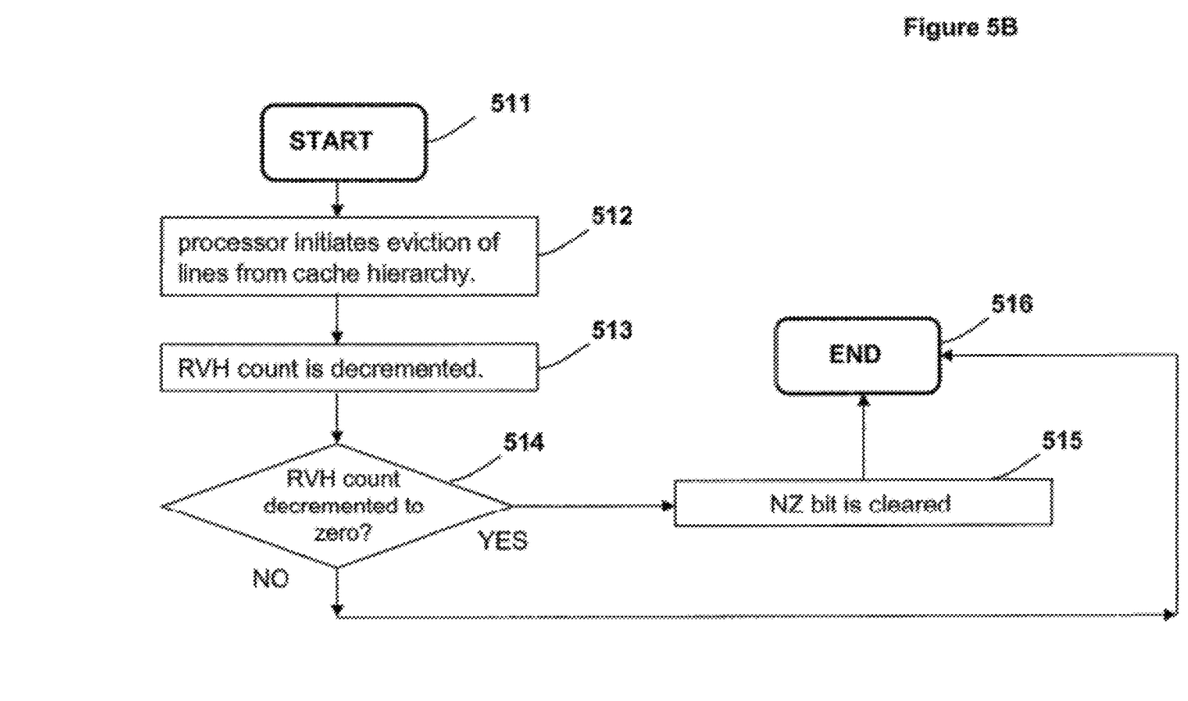
FIG. 5B is a flow chart illustrating the process of determining the RVH count based on eviction of lines from the cache hierarchy, according to one embodiment.

FIG. 5A is a flow chart illustrating the process of determining the RVH count based on eviction of regions from the RCA, according to one embodiment. FIG. 5B is a flow chart illustrating the process of determining the RVH count based on eviction of lines from the cache hierarchy, according to one embodiment. Although the methods illustrated in FIG. 5 (5A, 5B) may be described with reference to components shown in FIGS. 1-4, it should be understood that this is merely for convenience and alternative components and/or configurations thereof can be employed when implementing the various methods. Thus, the methods are described from the perspective of either/both processor 101 and DPS 100.

The process of FIG. 5A begins at initiator block 501 and proceeds to block 502, at which the processor initiates eviction of a particular region in Region Coherence Array (RCA) 107. At decision block 503, Cache Controller 114 determines whether the (corresponding) RCA line-count for the evicted region is non-zero. If at block 503, Cache Controller 114 determines that the corresponding RCA line-count is zero, the process ends at block 506. If at block 503, Cache Controller 114 determines that the RCA line-count is non-zero, the process proceeds to block 504, at which, the RVH count indexed by the RCA region address is incremented by the value of the RCA line-count. At block 505, the NZ-bit is set (to a non-zero value). The process ends at block 506.

The process of FIG. 5B begins at initiator block 511 and proceeds to block 512, at which the processor initiates eviction of a particular set of lines (previously evicted from the RCA) from the cache hierarchy. The lines may be evicted from the cache hierarchy to make room for other data, or another processor may request exclusive copies of the lines, invalidating the lines from the cache. At block 513, the corresponding RVH count is decremented by a value based on the number of lines evicted from the cache. At decision block 514, Cache Controller 114 determines whether the RVH count is decremented to a zero value. If at block 514, Cache Controller 114 determines that the RVH count is decremented to zero, the process proceeds to block 515, at which the NZ-bit is cleared, i.e., set to zero. If at block 514, Cache Controller 114 determines that the RVH count is not decremented to zero, the process proceeds to block 516, at which the process ends.

In the flow charts above, one or more of the methods are embodied as a computer program product in a computer readable medium or containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture (or computer program product) in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a computer program product in a variety of forms, and that an illustrative embodiment of the present invention applies equally regardless of the particular type of media used to actually carry out the distribution. By way of example, a non exclusive list of types of media, includes recordable type (tangible) media such as floppy disks, thumb drives, hard disk drives, CD ROMs, DVDs, and transmission type media such as digital and analogue communication links.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. In a data processing system having a processor with a cache hierarchy that includes one or more caches, a method comprising:
   initiating an eviction of a data region from a region coherence array (RCA) without requiring eviction of lines of the data region from the cache hierarchy of the processor, wherein the RCA is a set-associative array associated with the processor but is separate from the one or more caches of the processor and wherein lines from the evicted data region of the RCA still reside in the one or more caches of the processor;
   determining a line count pertaining to the data region;
   in response to the eviction of the data region from the RCA and the data region having a non-zero line count, adding the line count to a corresponding count value within a Region Victim Hash (RVH), wherein said count value is indexed by an address of the data region; and
   resolving via the RVH an external snoop request for a data region indexed with a non-zero count.

2. The method of claim 1, further comprising:
   maintaining the region with a non-zero line count in the RCA until a corresponding update of the count value in the RVH, wherein said region is identified for subsequent eviction; and
   when a cache hit occurs, a RVH count is non-zero, and a corresponding presence bit equals zero to indicate that a set of lines corresponding to the RVH count is not present in the RCA, moving the set of lines to the RCA.

3. The method of claim 1, wherein
   the RVH count is large enough to represent a maximum number of lines that are able to be simultaneously cached from regions that map to an RVH entry.

4. The method of claim 1, further comprising:
   in response to eviction of the lines from the cache hierarchy and (a) the region not being present in the RCA or (b) the RCA line count being zero for the region, decrementing the corresponding count in the RVH by a value based on the number of lines evicted from the cache hierarchy.

5. The method of claim 1, further comprising:
   receiving the snoop request for the region indexed by the corresponding region address; and
   in response to the RVH count indexed by the requested region address being non-zero or the requested region being present in the RCA with non-zero line-count, issuing a snoop response that indicates that the requested region is present in the cache hierarchy.

6. The method of claim 1, further comprising:
   resolving one or more issues related to a parity violation by a flush of the processor's cache hierarchy;
   rebuilding an RVH state as lines are brought into the cache hierarchy; and
   incorporating Error Correction Code (ECC) bits into an RVH entry or groups of adjacent RVH entries to enhance data integrity.

7. The method of claim 1, wherein the RVH is indexed by lower region-address bits.

8. The method of claim 1, wherein an RVH count has a maximum count value, wherein said maximum count value is a sum, wherein said sum is a result of a set of components including: a number of outstanding requests; and a product of a plurality of count value factors.

9. The method of claim 8, wherein said count value factors include: (a) a number of lines in a region; (b) a sum of one or more of: associativities of caches in a processor's cache hierarchy; and a maximum associativity for an inclusive cache hierarchy; and (c) a ratio of a cache index range to an RCA index range, wherein said RCA index range is greater than one.

10. The method of claim 1, further comprising:
receiving the snoop request for the region indexed by the corresponding region address; and
in response to the RVH count indexed by the requested region address being zero and the requested region not being present in the RCA, generating a snoop response that indicates that the requested region is not present in the cache hierarchy.

11. The method of claim 1, wherein: an entry within the RVH optionally contains an NZ-bit to indicate whether the count is non-zero and one or more parity bits; and the NZ-bit enables fast access on external snoops.

12. A data processing system comprising:
one or more processors;
a cache subsystem having a cache hierarchy with one or more caches;
a region coherence array that is separate from the one or more caches of the processor;
logic executing on the data processing system that:
initiates an eviction of a data region from a region coherence array (RCA) without requiring eviction of lines of the data region from the cache hierarchy of the processor, wherein the RCA is a set-associative array associated with the processor and wherein lines from the evicted data region of the RCA still reside in the one or more caches of the processor;
determines a line count pertaining to the data region;
in response to the eviction of the data region from the RCA and the data region having a non-zero line count, adds the line count to a corresponding count value within a Region Victim Hash (RVH), wherein said count value is indexed by an address of the data region; and
resolves, via the RVH, an external snoop request for a data region indexed with a non-zero count.

13. The data processing system of claim 12, further comprising logic that:
maintains the region with a non-zero line count in the RCA until a corresponding update of the count value in the RVH, wherein said region is identified for subsequent eviction; and
in response to a cache hit occurring, while a RVH count is non-zero, and a corresponding presence bit equals zero to indicate that a set of lines corresponding to the RVH count is not present in the RCA, moves the set of lines to the RCA.

14. The data processing system of claim 12, wherein the RVH count is large enough to represent a maximum number of lines that are able to be simultaneously cached from regions that map to an RVH entry.

15. The data processing system of claim 12, further comprising logic that:
in response to eviction of the lines from the cache hierarchy and (a) the region not being present in the RCA or (b) the RCA line count being zero for the region, decrements the corresponding count in the RVH by a value based on the number of lines evicted from the cache hierarchy.

16. The data processing system of claim 12, further comprising logic that:
receives the snoop request for the region indexed by the corresponding region address; and
in response to the RVH count indexed by the requested region address being non-zero or the requested region being present in the RCA with non-zero line-count, issues a snoop response that indicates that the requested region is present in the cache hierarchy.

17. The data processing system of claim 12, further comprising logic that:
resolves one or more issues related to a parity violation by a flush of the processor's cache hierarchy;
rebuilds an RVH state as lines are brought into the cache hierarchy; and
incorporates Error Correction Code (ECC) bits into an RVH entry or groups of adjacent RVH entries to enhance data integrity.

18. The data processing system of claim 12, wherein an RVH count has a maximum count value, wherein said maximum count value is a sum, wherein said sum is a result of a set of components including: a number of outstanding requests; and a product of a plurality of count value factors; and said count value factors include: (a) a number of lines in a region; (b) a sum of one or more of: associativities of caches in a processor's cache hierarchy; and a maximum associativity for an inclusive cache hierarchy; and (c) a ratio of a cache index range to an RCA index range, wherein said RCA index range is greater than one.

19. The data processing system of claim 12, said logic further comprising logic that:
receives the snoop request for the region indexed by the corresponding region address; and
in response to the RVH count indexed by the requested region address being zero and the requested region not being present in the RCA, generates a snoop response that indicates that the requested region is not present in the cache hierarchy.

20. The data processing system of claim 12, wherein: an entry within the RVH optionally contains an NZ-bit to indicate whether the count is non-zero and one or more parity bits; and the NZ-bit enables fast access on external snoops.

* * * * *